United States Patent [19]

Blair et al.

[11] 4,324,356

[45] Apr. 13, 1982

[54] PROCESS FOR JOINING SILICON NITRIDE BASED CERAMIC BODIES

[75] Inventors: Howard D. Blair, Romulus; Morton E. Milberg, Southfield, both of Mich.

[73] Assignee: Ford Motor Company, Dearborn, Mich.

[21] Appl. No.: 25,148

[22] Filed: Mar. 29, 1979

[51] Int. Cl.$^3$ .................. B23K 31/00; B23K 35/24; B23K 35/38

[52] U.S. Cl. .................. 228/193; 29/156.8 R; 29/420; 416/241 B; 264/60; 264/65

[58] Field of Search ............... 29/156.8 R, 156.8 B, 29/420, 420.5; 228/121, 193; 416/241 B; 264/65, 81, 60

[56] References Cited

U.S. PATENT DOCUMENTS

| | | | |
|---|---|---|---|
| 2,198,578 | 4/1940 | Hazelton, Jr. et al. | 228/121 |
| 3,517,432 | 6/1970 | Sandstrom | 228/121 |
| 3,854,189 | 12/1974 | Ezis et al. | 29/156.8 R |
| 3,966,855 | 6/1976 | Hollenberg et al. | 264/65 |
| 3,973,875 | 8/1976 | Bird | 416/241 B |
| 4,051,585 | 10/1977 | Walker et al. | 228/121 |
| 4,055,451 | 10/1977 | Cockbain et al. | 264/60 |
| 4,058,246 | 11/1977 | Nicklaus | 228/121 |

FOREIGN PATENT DOCUMENTS

| | | | |
|---|---|---|---|
| 2604171 | 8/1977 | Fed. Rep. of Germany | 416/241 B |
| 917416 | 2/1963 | United Kingdom | 228/121 |
| 1381478 | 3/1975 | United Kingdom | 228/121 |

OTHER PUBLICATIONS

Jack, K. H., "Review Sialons and Related Nitrogen Ceramics", from Journal of Materials Science II, 1976, pp. 1135–1158.

*Primary Examiner*—Daniel C. Crane
*Attorney, Agent, or Firm*—Joseph W. Malleck; Olin B. Johnson

[57] ABSTRACT

A method of joining silicon nitride based ceramic bodies is disclosed. At least one interfacing surface of shaped bodies (one or both of which may be hot-pressed or reaction-sintered) receives a layer of metallic aluminum based material. The bodies with the metallic aluminum based material therebetween are subjected to heating at 1400°–1900° C. for a period typically 0.5–2 hours in a nitriding atmosphere to effect a chemical bond consisting of a conversion of the interfacing ceramic to a Si—Al—O—N system.

14 Claims, No Drawings

PROCESS FOR JOINING SILICON NITRIDE BASED CERAMIC BODIES

BACKGROUND OF THE INVENTION

The properties usually quoted for silicon nitride and other silicon nitride based materials such as Sialon make them ideal candidates for certain engine components. These properties usually consist of high strength, wear resistance, high decomposition temperature, oxidation resistance, excellent thermal shock properties, and resistance to corrosive environments. One major difficulty, however, is in fabricating suitable shapes with these desirable properties.

Although it has recently been shown that, with suitable additives, silicon nitride can be sintered to reasonably high density, the technique has not yet been developed to the point of wide application, and the mechanical properties of the sintered products deteriorate at high temperature, probably as a result of the additives employed. The two methods usually used to fabricate silicon nitride based ceramic bodies are called "reaction sintering" and "hot pressing."

In reaction-sintering, the required shape is first made from compacted silicon powder which is then nitrided in molecular nitrogen or a suitable nitrogen-containing atmosphere at about 1400° C. to give a product averaging about 25% in porosity, although current best practice can produce materials with about 15% porosity. The reaction sintering process usually consumes several days and employs a complex heating cycle. To speed up nitriding, at least 1% Fe is usually added. The original dimensions of the silicon compact remain virtually unchanged during nitriding and therefore quite complex shapes can be obtained, such as turbine blading.

The alternative is to hot press silicon nitride powder with suitable additives under pressures of several thousand psi in a graphite die at about 1700°–1800° C. to produce a silicon nitride product which is essentially fully dense. The highest strength material, at least at room temperature, is obtained only by hot pressing, but this is expensive and is limited to fairly simple shapes. At high temperatures there is some deterioration of mechanical properties, attributed to the hot pressing additives.

A reaction sintered material is fabricated easily, simply by the nitriding process. Unfortunately, it is not strong enough for many applications and, owing to its porosity and consequent high surface area, not very oxidation resistant. However, its mechanical properties do not deteriorate at high temperature.

Accordingly, what is needed is a convenient method that will selectively permit the bonding of either hot-pressed or reaction sintered ceramic bodies into a shape not achievable in one body except by expensive machining. In some instances there is a need to combine the best qualities of both hot-pressed and reaction sintered silicon nitride bodies, permitting one to be used for certain complex components and the other to be used for high strength components, the components then being bonded together in an assembly.

In other instances it may be desired to combine two or more hot pressed or reaction sintered bodies; some shapes are not achievable even by reaction sintering because of the limitations on powder compaction techniques (cold pressing, injection molding, slip casting, etc.), such as when interior spaces with no exterior access are to be formed.

The prior art has approached bonding of ceramic bodies principally by two methods, (a) a chemical bond which results from the use of high pressure over extremely long periods of time, and (b) a predominantly mechanical bond. The type of chemical bonding used here-to-date can be exemplified by reference to a typical mode for making a ceramic gas turbine blading assembly. The blade ring for the assembly is formed first by the method or reaction sintering. The blades accordingly have some degree of porosity but of course are formed in complex shapes and are silicon nitride containing a small amount of iron (about 1%), and trace impurities, as well as an oxide layer. The blades are then put into a die; silicon powder is packed between the blades and reaction sintered to form webs; next, more powder is packed about the blades and webs and reaction sintered to form a strong casing. Silicon nitride powder is then placed in the center of the blade, webs and casing assembly and hot-pressed to form a hub of the silicon nitride. The reaction sintered assembly acts as a die and must withstand considerable pressures. Pressing is carried out under a temperature of about 1700° C. for several hours of continuous hot-pressing. In the process, of course, several of the blades may be destroyed by the pressure applied. A bond is created between the hot-pressed hub and the reaction sintered blading possibly by virtue of a slight diffusion of the pressing aides, such as magnesium oxide or yttrium oxide into the reaction sintered material. The long period at high temperature typically causes deterioration of the blades. The total process including removal of the webs and casing takes several weeks.

Mechanical bonding has been carried out by the prior art in a variety of different ways. For example, an aqueous suspension of silicon containing a binder (e.g. ammonium alginate) is permitted to penetrate into the pores of the silicon nitride body; the binder is driven off by heat and the silicon is nitrided to form a silicon nitride bridge. This is considered a predominately mechanical bond and is best illustrated in U.S. Pat. No. 3,966,885. Unfortunately, this method will not work well with hot-pressed silicon nitride because of the inability of the silicon to penetrate this dense material.

What is needed is a method by which interfacing surfaces of silicon nitride based bodies, whether sintered, hot-pressed or reaction sintered, can be joined together without the necessity for high pressure and without the need for long periods of heating. it is hoped that a portion of the interfacing bodies of silicon nitride can be converted to a new ceramic system by short time heating without the use of pressure.

SUMMARY OF THE INVENTION

A primary object of this invention is to provide an improved bond between silicon nitride based ceramic bodies.

Another object of this invention is to provide an improved method of joining different silicon nitride based bodies merely by the use of heating for short periods of time without the use of pressure.

Specific features pursuant to the above objects comprise: (a) converting a portion of the interfacing silicon nitride based bodies to a ceramic created by a reaction between added aluminum, oxygen (present in the oxide film on the ingredients involved and, if desired, as added oxides of aluminum and/or silicon) and $Si_3N_4$, to form compounds in the Si—Al—O—N system, (b) the converted ceramic may be achieved by placing a layer of aluminum between the interfaced silicon nitride based bodies and heating to a temperature of about 1550° C. for about 1 hour without the use of pressure, except for maintaining the silicon nitride bodies lightly pressed together with said aluminum therebetween, (c) for the best bond, limiting the added aluminum to that which will fully react and form a Si—Al—O—N system with no aluminum excess, and (d) insuring that at least a portion of the added aluminum is added in the uncombined metallic form and is melted.

DETAILED DESCRIPTION

Chemical bonding is promoted between silicon nitride based bodies in accordance with this invention by the process of forming a Si—Al—O—N system at the interface in a relatively short period of time. Atomic displacement of nitrogen and silicon atoms respectively by oxygen and aluminum takes place. The bonding ceramic (Si—Al—O—N) is produced by displacing certain silicon atoms (valency of +4) with aluminum (valency of +3). This electrical unbalance is neutralized by displacement of certain nitrogen atoms (valency −3) with oxygen atoms (valency −2).

It is believed that by following the steps of this invention, an easily fabricated new ceramic system (Si—Al—O—N) is created at the interface which promotes significant diffusion into both hot-pressed and reaction sintered bodies.

A preferred method for carrying out the present method is as follows:

(1) separately shaped bodies of silicon nitride based materials are provided; one or both of the bodies may be hot-pressed, reaction sintered, or, for that matter, pressureless sintered. Both of the bodies, however, are formed with a mating surface along which they are to be bonded. Any silicon nitride based material may be employed. This may include such materials as Sialon or plain $Si_3N_4$ containing pressing additives such as MgO or $Y_2O_3$.

(2) A thin layer of film of a metallic aluminum based material is applied to at least one mating surface of said shaped bodies. The aluminum based film may consist of any combination of aluminum, silicon and their oxides. Since it is a Si—Al—O—N material that is to be created in principal, any of the elements for this system can serve as the ingredients for layer or film. Accordingly, $Si_3N_4$, $SiO_2$, $Al_2O_3$, Si and AlN may be present.

Since silicon and nitrogen are present in the materials to be joined, they need not necessarily be present in the bonding layer or film. Oxygen is always present in an oxide layer on the surface of silicon nitride and of aluminum, so, again, it need not necessarily be included as oxides in the bonding layer. Whether or not these elements are included in the bonding layer depends on the ultimate stoichiometry desired. However, metallic aluminum must be present in the bonding layer to initiate reaction, in its molten state, with the silicon nitride based bodies to be joined. Because metallic aluminum is present, the bonding reaction must be carried out in a nitriding atmosphere, since metallic residues are undesirable.

The bonding reaction behaves as if the molten aluminum in the bonding layer reacts with the surface region of the silicon nitride body and the oxygen in the oxides present to form a Si—Al—O—N material, releasing silicon which, in turn, reacts with the nitrogen gas to form additional silicon nitride, which can react further. This sort of reaction sequence is suggested by the observation that, when a large excess of metallic aluminum is used, a residue of metallic silicon, but no aluminum, remains. The actual Si—Al—O—N phases formed in the bonding region depend on the proportions of Si, Al, O and N present, and on the reaction conditions.

The bonding layer can be deposited in a number of ways, by vacuum evaporation, powder deposition, or as a foil, for example. Vacuum evaporation provides good control of thickness, uniformity and composition (oxides as well as metals can be deposited), but is relatively expensive, time consuming and somewhat difficult to apply to some complex shapes. Powders are simple to apply and provide full control over composition, but provide poor control over uniformity and tend to be rather thick. Foils are extremely easy to apply and are very uniform, but are fairly thick (0.5–1 mil), and unless anodized, provide oxygen only to a depth of approximately 75 Å which constitutes the passive oxide layer.

The initial thickness of the bonding layer can vary between quite wide limits. The lower limit on thickness is determined by the requirement of enough reactant material to form a good bond and this, in turn, depends on the nature of the materials being joined. The reacted zone, after bonding, in a relatively porous material, such as reaction sintered silicon nitride, is much thicker than that in a very dense material like hot-pressed silicon nitride, typically, about ten times as thick. Thus, an initially thinner bonding layer can be tolerated in bonding hot-pressed silicon nitride than in bonding reaction sintered silicon nitride. Similarly, smooth mating surfaces can be bonded with thinner layers than can rough surfaces, since fewer and smaller gaps need be filled by the products of the bonding reaction. Finally, and obviously, initially dense bonding layers, such as vacuum deposited coatings and foils, can be thinner than initially porous bonding layers, such as deposited powders. All in all, it is unlikely that a bonding layer much less than 100 Å thick will provide enough material to form a good bond in the best case.

The upper limit on the initial bonding layer thickness is determined by the undesirability of a metallic residue after bonding. Again, the thickness above which a metallic residue will remain depends on the nature of the materials being bonded, in a manner analogous to that in which the minimum thickness does. In addition, however, excess molten aluminum may be squeezed out of the joint area before any bonding reaction occurs by the pressure used to keep the mating surfaces in contact, since aluminum melts at about 660° C., well below the bonding reaction temperature. Thus, a layer which is initially too thick may be thin enough when the reaction temperature is reached.

As with the thickness, the initial composition of the bonding layer can vary considerably, so long as metallic aluminum and a source of oxygen are present. If some particular stoichiometry in the bonded region is desired, then the initial composition of the bonding layer must be adjusted accordingly. Thus, if, for some reason, it is desired that the bonding region have the composition of so-called $\beta'$-Sialon, namely, $Si_3N_4 \cdot X (Al_2O_3 \cdot AlN)$, then care must be taken tto supply the required proportions of aluminum and oxygen in the bonding layer, recognizing that nitrogen will be supplied by the nitriding atmosphere, that some of the oxygen will be in the passive oxide layers on aluminum and silicon nitride, that any additional oxygen required can be supplied either by $Al_2O_3$ or $SiO_2$, and that the quantity of metallic aluminum required will depend, in part, upon the source of oxygen employed. However, it should be recognized that there are many phases in the system Si—Al—O—N [Reference: K. H. Jack. J. Materials Sci. 11, 1135 (1976).], and there may be no obvious reason to prefer any particular one of them, e.g., $\beta'$-Sialon.

(3) While the mating surfaces and aluminum layer are in intimate contact, the assembly is heated in a nitriding atmosphere for a period of about 1 hour at a temperature level of 1400°–1900° C., or preferably 1550°–1600° C. The upper limit is determined by the decomposition and degradation of $Si_3N_4$. At 1900° C., good bonds may be formed, but the product is deformed. Temperatures over 1650°–1700° C. tend to give noticeable degradation in about 1 hour. The temperature level and time of exposure are interrelated in an exponential function. The exponential function may be expressed as rate$=kf(c)$, where $f(c)$ is a function of the concentration of reactants, and $k\sim\rho E_{act}/RT$ where $E_{act}$ is the activation energy of reaction, R is the gas constant and T is the absolute temperature. Thus, shorter times can be used at higher temperatures or longer times at lower temperatures. Although a heating time of 1 hour is a minimum preferred at 1600° C., longer periods of time may be employed, which of course, become progressively uneconomical.

The resulting chemically bonded assembly is characterized by a differential thermal expansion which is not detrimental to the serviceability of the composite part. Silicon nitride based bodies, as above described, have been joined and have been subjected to heating and quenching between temperature extremes of 2500° F. and room temperature. In addition, the bond strength achieved by following the steps of this invention will consistently provide a strength level in excess of the threshold level for acceptable bond strength in gas turbine engine applications. The weakest bond determined by a four-point bend strength test (with all varieties of samples joined end-to-end in a bar in accordance with this invention) have been 8–9000 psi. Typically the structures can achieve a bend strength level of at least 10,000 psi; more than 20,000 psi have been achieved wherein the silicon nitride base material failed before the bonding region failed.

What is claimed is:

1. A method of joining silicon nitride based bodies, comprising:
   (a) providing separately shaped bodies of silicon nitride based materials, either one or both of such bodies being formed by at least one mode selected from the group comprising pressureless sintering, reaction sintering and hot pressing, each of said bodies having a mating surface along which they are to be bonded.
   (b) applying to at least one of said surfaces a film of metallic aluminum based material,
   (c) assembling said shaped bodies together with the mating surfaces juxtaposed and in contact with said film of aluminum based material intervening, said mating surfaces and metallic aluminum based material carrying surface oxide, and
   (d) while maintaining said surfaces in contact with said film, heating said assembly in a reactive nitriding atmosphere for a period of at least 0.5 hour at a temperature between 1400° C. and 1900° C. to effect an atomic displacement chemical bond between said silicon nitride based materials, metallic aluminum based material, surface oxide and nitriding atmosphere.

2. The method as in claim 1, in which said chemical bond is effected by displacement of silicon and nitrogen atoms of said shaped bodies with aluminum and oxygen atoms, respectively, any excess silicon combining with the $N_2$ in said atmosphere to substantially eliminate said excess silicon.

3. The method as in claim 2, in which some of the oxygen atoms are supplied by an oxide film on said metallic aluminum based material, and some of the oxygen is supplied by an oxide on the silicon nitride based bodies.

4. The method as in claim 3, in which said metallic aluminum based material comprises a foil, oxidized on one side to provide a predetermined cation ratio between said aluminum and oxygen.

5. The method as in claim 1, in which said metallic aluminum based material is applied by vapor deposition to form a layer having a thickness controlled to no less than 150 angstroms.

6. The method as in claim 1, in which said chemical bond is effected without substantial penetration of the pores of the silicon nitride based materials.

7. The method as in claim 1, in which at least one of said bodies is non-porous, formed by a hot-pressing technique.

8. The method as in claim 1, in which the bonding is achieved by a chemical reaction wherein the silicon adjacent the interface in both of said bodies is displaced by aluminum, and the nitrogen in both of said bodies at the interface is replaced by oxygen to form a Si—Al—O—N system.

9. The method of claim 1, in which said metallic aluminum based material is an aluminum or aluminum alloy foil having a thickness of 0.5–1.0 mils, and wherein slight pressure is applied in step (b) to squeeze melted aluminum out of said interface in excess of a film thickness.

10. The method as in claim 1, in which said metallic aluminum based material is a film comprised of a composite of aluminum and aluminum oxide.

11. A method of joining surfaces of silicon nitride based bodies, comprising:
   (a) vapor depositing a film of metallic aluminum onto at least one surface to be joined,
   (b) while urging said surfaces together with tight contact, heating said bodies to a temperature of about 1600° C. for about one hour in a nitriding atmosphere to effect a Si—Al—O—N system bond therebetween.

12. The method as in claim 11, in which the resulting product of said method is a ceramic composite which experiences no bond fracture when subjected to heating at 2500° F. and quenching to room temperature.

13. The method as in claim 11, in which the resulting product of practicing the method is a bonded composite ceramic structure having an average statistical bend strength of at least 8000 psi.

14. The method as in claim 11, in which the film is preferably controlled to a thickness between 150–60,000 angstroms.

* * * * *